(12) United States Patent
Aronin (10) Patent No.: US 6,454,650 B1
(45) Date of Patent: Sep. 24, 2002

(54) FREE REMOTE LOTTERY SYSTEM

(76) Inventor: Kevin J. Aronin, 20 Echo Bay Pl., New Rochelle, NY (US) 10805

( * ) Notice: Subject to any disclaimer, the term of this patent is extended or adjusted under 35 U.S.C. 154(b) by 0 days.

(21) Appl. No.: 09/568,199

(22) Filed: May 9, 2000

(51) Int. Cl.$^7$ .................................................. A63F 9/24

(52) U.S. Cl. ............................. 463/17; 463/29; 463/42; 705/14

(58) Field of Search .......................... 463/17–22, 25–27, 463/40–42, 30, 36, 29; 273/138.1, 138.2, 236–237, 269; 379/93.13; 705/14, 17, 39, 41, 44

(56) References Cited

U.S. PATENT DOCUMENTS

| | | |
|---|---|---|
| 4,669,730 A | 6/1987 | Small |
| 4,815,741 A | 3/1989 | Small |
| 4,982,346 A | 1/1991 | Girouard et al. |
| 5,227,874 A * | 7/1993 | Von Kohorn ................ 358/84 |
| 5,232,221 A | 8/1993 | Sludikoff et al. |
| 5,282,620 A | 2/1994 | Keesee |
| 5,403,999 A | 4/1995 | Entenmann et al. |
| 5,415,416 A | 5/1995 | Scagnelli et al. |
| 5,613,679 A | 3/1997 | Casa et al. |
| 5,768,382 A * | 6/1998 | Schneier et al. .............. 463/29 |
| 5,774,869 A | 6/1998 | Toader |
| 5,791,990 A | 8/1998 | Schroeder et al. |
| 5,816,919 A | 10/1998 | Scagnelli et al. |
| 5,823,879 A * | 10/1998 | Goldberg et al. ............ 463/42 |
| 5,851,149 A | 12/1998 | Xidos et al. |
| 5,857,911 A | 1/1999 | Fioretti |
| 5,871,398 A | 2/1999 | Schneier et al. |
| 5,898,594 A | 4/1999 | Leason et al. |
| 5,904,619 A | 5/1999 | Scagnelli et al. |
| 5,910,047 A | 6/1999 | Scagnelli et al. |
| 5,921,865 A | 7/1999 | Scagnelli et al. |
| 5,954,582 A | 9/1999 | Zach |
| 5,984,779 A | 11/1999 | Bridgeman et al. |
| 6,001,016 A | 12/1999 | Walker et al. |
| 6,004,206 A | 12/1999 | Fabri |
| 6,016,338 A | 1/2000 | Bansal et al. |
| 6,024,641 A * | 2/2000 | Sarno ........................... 463/42 |
| 6,036,601 A * | 3/2000 | Heckel ......................... 463/42 |
| 6,080,062 A * | 6/2000 | Olson ........................... 463/42 |

FOREIGN PATENT DOCUMENTS

| | | |
|---|---|---|
| GB | 2287342 B | 9/1995 |
| GB | 2287342 A | 9/1995 |
| WO | WO96/00950 A1 | 1/1996 |
| WO | WO97/02074 A1 | 1/1997 |
| WO | WO97/49470 A1 | 12/1997 |
| WO | WO99/63494 A2 | 12/1999 |

OTHER PUBLICATIONS

US 5,823,877, 10/1998, Scagnelli et al. (withdrawn)

Virtumundo, Inc.. Treeloot.com http:www.treeloot.com All, See Insert, Dec. 1998.*

K–Mart Department Store Bluelight.com http:bluelight.com All, See Insert, Dec. 1998.*

Spinway, Inc. Spinway.com http:spinway.com All, See Insert, Dec. 1998.*

Website www.allfreelotto.com, launch date unknown, Email–Lotto, 20 forest Ave. #100, Fond du Lac. WI 54395.

Website www.email–lotto.com, launch date unknown—Email–Lotto, 20 Forest Ave. #100, Fond du Lac, WI. 54395.

(List continued on next page.)

Primary Examiner—Mark Sager
(74) Attorney, Agent, or Firm—Amster, Rothstein & Ebenstein (57) ABSTRACT

The free remote lottery system is played by a participant who selects a set of indicia that either fully or partially matches an official winning set of indicia and receives a prize, without wagering any money or purchasing tickets in order to participate in the lottery and qualify for a prize. The participant must select information about one or more products or services in order to participate in the lottery.

22 Claims, 7 Drawing Sheets

OTHER PUBLICATIONS

Website www.extremelotto.com, launch date unknown—Iwin, Inc. 10940 Wilshire Blvd. Los Angeles, CA 90024.

Website www.Freelottopowerplay.com, launch date unknown—freelottopowerplay.com, 3602 W. Lone Cactus Dr. Glendale, AZ 85308.

Website www.freemoneylotto.com, launch date unknown, Free Money Casino. com, Inc., P.O. Box 700, Goddard, KS 67052–0700.

Website www.grouplotto.com, launch date unknown—GroupLotto, 1 Blue Hill Plaza, Pearl River, NY 10965.

Website www.imustlotto.com, launch date unknown—Oracle Management Services, 5900 San Fernando Rd. 2nd Floor, Glendale, CA 91202.

Website www.lottoballs.com, launch date unknown—Lottoballs.com, LLC, 26 Windance Dr., Lake Villa, IL 60046.

Website www.luckysurf.com, launch date Sep., 1999—LuckySurf.com, Inc., 395 Oyster Point Blvd. Suite 110, San Francisco, CA 94080.

Website www.totallyfreelotto.com, launch date unknown, Tim Luedtke, 20 Forest Ave. #100, Fond du Lac, WI 54395.

Website www.webmillion.com, launch date unknown; 1770 W. State St., Suite 318, Boise, ID 83702.

* cited by examiner

FREE LOTTO®

( Play Now! ) ( Tell a Friend - Win a Dream Vacation ) ( Rules  Help Desk ) ( Edit Player Profile )

( Recent Winners  State Lottery Results  See the Results  How it Works  Advertise with Us!  Our Partners  Privacy Policy )

| Banner Ad |
|---|

| Your Name as it should appear on your Prize Winning Checks: |
|---|

Note: When claming FeeLotto prizes you must provide FreeLotto with proof of identity that exactly matches your name as typed below.

| First Name | [                    ] | Middle Initial | [  ] |
| Last Name | [                    ] | | |

| Your address to send your prize winning checks to: |
|---|

| Address | [                                    ] | | |
| City | [                        ] | Zip/Postal Code | [        ] |
| State/Province | [ Plese select a State or Province ▼ ] | | |
| Country | [ Plese select a country ▼ ] | | |

| Your FreeLotto entries will be confirmed by E-mail. |
|---|

| Email | [            ] | Confirm (repeat) Email | [            ] |

| Please select a FreeLotto Username and Password and keep this information in a safe place. |
|---|

| FreeLotto Username | [            ] | FreeLotto Password | [            ] |
| | | Confirm FreeLotto Password | [            ] |

| I have read the FreeLotto rules and agree to be bound by them. |
|---|

FREE® LOTTO

[ Play Now! ] [ Tell a Friend - Win a Dream Vacation ] [ Rules  Help Desk ] [ Edit Player Profile ]
[ Recent Winners   State Lottery Results   See the Results   How it Works   Advertise with Us!   Our Partners   Privacy Policy ]

FREE LOTTO®

$ 1,000,000.00 DAILY JACKPOT

| 1  | 2  | 3  | 4  | 5  |
|----|----|----|----|----|
| 6  | 7  | 8  | 9  | 10 |
| 11 | 12 | 13 | 14 | 15 |
| 16 | 17 | 18 | 19 | 20 |
| 21 | 22 | 23 | 24 | 25 |
| 26 | 27 | 28 | 29 | 30 |
| 31 | 32 | 33 | 34 | 35 |
| 36 | 37 | 38 | 39 | 40 |
| 41 | 42 | 43 | 44 | 45 |
| 46 | 47 | 48 | 49 | 50 |
| 51 | 52 | 53 | 54 | 55 |

Win $ 1,000,000.00!

Instructions

Your gameboard will appear in a moment on the left Pick 6 numbers or choose Quick Pick
Then click a banner below to place your Freebet™
To log in as another user log in here
Click a banner below to place your Freebet™

[ Banner Ad ]

[ Banner Ad ]

[ Banner Ad ]

FREE REMOTE LOTTERY SYSTEM

BACKGROUND OF THE INVENTION

1. Technical Field of the Invention

The present invention relates generally to the field of conducting sweepstake-type games in lottery format over a computer network, and in particular to a method of and system for allowing each individual participant to use his or her personal computer to connect over the Internet to a Web server of a lottery authority operating on the host computer system, submit his or her lottery selection to the lottery authority, and participate in the lottery drawing by receiving a chance to qualify for a substantial prize without any purchase of a lottery ticket or any other form of wagering or payment. The lottery system according to the present invention is structured in way that automatically links the submission of each lottery participant containing numbers chosen by that participant to information about products and services advertised by various Internet vendors and each lottery participant, who must agree to receive such information as a condition for participation in the lottery.

2. Description of Related Art

Generally, lottery games are conducted as a state-wide governmental system where the participants make their selections and participate in the game, usually by wagering a small amount (e.g., one dollar ($1.00)) for each selection submitted to the lottery authority. In addition, as a confirmation that the chosen selection has been processed and sent to the lottery authority, each participant usually receives a lottery ticket with that participant's lottery selection, i.e. the numbers selected for a particular lottery drawing, printed thereon. This wagering and submission of the selected numbers by each participant is usually done at the local lottery ticket dispensing facilities, which relay to the lottery authority the selections of all participants that wagered or purchased their selection at those facilities. The participants may usually place new or additional wagers (by purchasing tickets at the local lottery ticket dispensing facilities) during a designated time period prior to the lottery drawing that is scheduled for a particular day and time. Then, after the close of that period, the lottery authority conducts a lottery drawing, during which a series of random numbers is selected by the lottery authority or another agency running the lottery drawing. The randomly selected numbers for a particular lottery drawing, i.e. the winning combination, are posted at all local lottery ticket dispensing facilities and may be announced through the mass media. The participants whose selections match the winning combination for a specific lottery drawing become eligible to receive a substantial monetary prize, the so-called jackpot, often in millions of dollars, by presenting their confirmation tickets to the lottery authority. The participants whose selections only partially match the winning combination may also become eligible to receive monetary prizes in lesser amounts.

Automated systems for submission of the selections chosen by the participants and confirmation of those selections through an automated telephone system or a computer network are known in the art. Examples of such systems are disclosed in the U.S. Pat. No. 5,851,149, issued to Xidos et. al., the U.S. Pat. No. 4,842,278, issued to Markowitz, U.S. Pat. Nos. 5,910,047, 5,904,619, 5,415,416, 5,816,919 and 5,823,877, issued to Scagnelli. Another example of such automated system is described in the U.S. Pat. No. 4,467,424, which discloses a remote gaming system that enables the player to participate in a lottery from a remote location though the computer network. Similarly, PCT International application No. PCT/US97/08457, published on Dec. 31, 1997, discloses the use of the Internet to communicate their selections to the central computer or a network of computers of the lottery authority that conducts lottery drawings, and to allow for verification of the submitted selections.

While the systems that utilize the Internet to conduct a lottery and provide for an automated submission, verification and processing of a selection from each lottery participant are known and described in the prior art, the known systems and method all require either placement of some wager by a participant, a charge against the participant's account or credit card, or some other type of consideration that is required in order for the participant to participate in the lottery and become eligible to receive a winning prize if his or her selection matches the winning combination. In the lottery systems known and described in the art, the jackpot and other prizes (i.e. large sums of money that are payed to the winners of the lottery) are derived from the funds received from the millions of lottery participants making their purchases or placing small wagers on their selections. Given the tremendous popularity of the lottery games with the public, as demonstrated by the fact that millions participate in numerous state lotteries weekly, there exists a need for a system to conduct a lottery where the participants would not need to wager their own funds or make any purchases in order to subsidize the winning jackpots for a relatively few winners of the lottery.

Additionally, with growing popularity of lotteries in the United States, where millions of people participate in the government-sponsored lottery games, the use of the lottery system where all participants must contribute and spend their money on a purchase of tickets for a small chance to become a winner of a large jackpot has been criticized as an unfair tax system that derives most of its revenue from the low and middle income communities that generally purchase most lottery tickets. These concerns for the disproportionate impact of the large-scale lottery games upon global economics emphasize the known shortcomings of the existing lottery systems and underline the substantial need for a free lottery system where the revenues used to pay for the jackpot prices and the expenditures and profits of the lottery authority would not be derived from the wagers and purchases of individual participants. Further, the popularity of the Internet has enhanced the value of lottery-type games.

SUMMARY OF THE INVENTION

Accordingly, it is an object of the present invention to provide a method and a system to conduct a truly free lottery, where individual participants are not required to wager any of their own funds or make any purchases in order to be eligible to participate in the lottery drawing held or supervised by the lottery authority and receive an equal chance at winning the large jackpot prize or a number of smaller prizes. Accordingly, the present invention provides a method and a system in which the submission of each selection chosen by a lottery participant is automatically linked to information about products or services advertised by various Internet vendors, i.e. companies that place their banner advertisements on the Web site running on the host computer system of the lottery authority, and each lottery participant must agree to receive such information. The participants in the lottery according to the current invention are not required to purchase any of the vendors' advertised products or services in order to submit their selections to the lottery authority or be eligible to participate in the lottery. Instead, the lottery method and system of the current invention provides for an automated system to satisfy the growing demand among vendors of products and services on the Internet to reach a wider sector of the public with information about their products and services by utilizing the growing interest of the public in playing lottery games over the Internet and their willingness to receive advertising information in exchange for the shift in cost for the participation in the lottery from individual participants onto the Internet vendors.

It is another object of the present invention to provide an Internet-based lottery system where the central host computer system that operates a Web server of the lottery authority may securely accommodate and process the selections and submissions of a large number of lottery participants and also be able to limit the number of selections that may be submitted by each individual participant for each lottery drawing. Accordingly, the present lottery system includes software components that receive and process personal information of each lottery participant that is provided by the participant when he or she first connects to the Web server of the lottery authority and submits a lottery selection (i.e. a set of chosen numbers that represents that participant's entry). The personal information submitted by each lottery participant may include name, address, E-mail address and may include other types of information that can be used to contact and inform the participant about winning numbers and whether the participant won any prize based on his or her submitted selections. In addition, each participant may be asked to submit additional personal information about his or her preferences and interests, such as, for example, particular types or categories of products or services about which the lottery participant would like to receive information. This additional information may be analyzed and processed by the software components running on the host computer system of the lottery authority to automatically connect the participant during the submission and processing of his or her lottery selections only to the products and services that match his or her interests and preferences.

In another aspect of the current invention, the software program or a component of a software program running on the host computer system of the lottery authority can identify the participants that have previously submitted their personal information to the lottery authority and avoid redundant and duplicative submission of personal information from the same participant. In yet another aspect of the current invention, the software program or a component of a software program running on the host computer system of the lottery authority determines when each participant reaches the maximum number of selections or submissions that are allowed per participant for a particular lottery drawing and restricts further submissions from that participant for a particular lottery drawing. In order to accomplish this aspect of the current invention, the lottery system could utilize so-called "cookie" technology that is commonly used on the Internet, i.e. storing identifying data or any other type of identifying information in the memory of a personal computer used by the participant, and then extracting, processing and updating that data when the participant again connects to the Web server running on the host computer system of the lottery authority. Utilizing this stored "cookie" data, is not preferable for security reasons. In the alternative, or in addition to the use of "cookies", other known types of techniques and technologies may be utilized to achieve the desired result, as, for example, requiring each participant to provide the Web server running on the host computer system of the lottery authority with a user-id and password (which could be encrypted for additional protection), and further requiring that each future submission of lottery selections by that participant be preceded by the submission and processing of the corresponding userid and password. The software program or a component on the host computer system of the lottery authority then identifies each individual participant, keeps track of the selections submitted by each participant for each lottery drawing and prevents submission and processing of submissions from the participants that have reached the maximum limit allowed per participant for a particular lottery drawing. In addition, depending on the circumstances, the number of entries allowed per participant may be varied for different draws.

Another object of the present invention is to provide an Internetbased lottery system where the central host computer system that operates a Web server of the lottery authority can automatically generate a verification notice, confirming the registration of participant's selection for a particular lottery drawing. The verification notice may be sent to each participant via E-mail to the address provided by the participant in the personal information that is submitted prior or during the first time that participant submits his entry to the lottery authority. In the alternative or in addition to the above-mentioned method, the verification notice may be posted on another Web page or another Web server, where the participants are directed to refer for the confirmation that their submissions were registered and processed by the lottery authority.

Yet another object of the present invention is to provide an Internet-based lottery system where the central host computer system that operates a Web server of the lottery authority automatically identifies all the participants whose submissions matched the winning combination, which is determined at a random drawing conducted at the specified day and time, and automatically generates lottery result notice to each participant in that drawing, informing him or her about winning combination and whether that participant is eligible to receive a prize based on his or her submissions for that drawing. As with verification notice, the lottery result notice may be sent to each participant's E-mail address, or posted on another Web page or another Web server, where the participants are directed to refer for the results of a particular lottery drawing.

BRIEF DESCRIPTION OF THE DRAWINGS

These and other objects, features and advantages of the invention, its construction and operation will be best understood from the following detailed description of preferred embodiments of the present invention, taken in conjunction with the accompanying drawings, of which.

DESCRIPTION OF THE PREFERRED EMBODIMENTS

Figure 1:
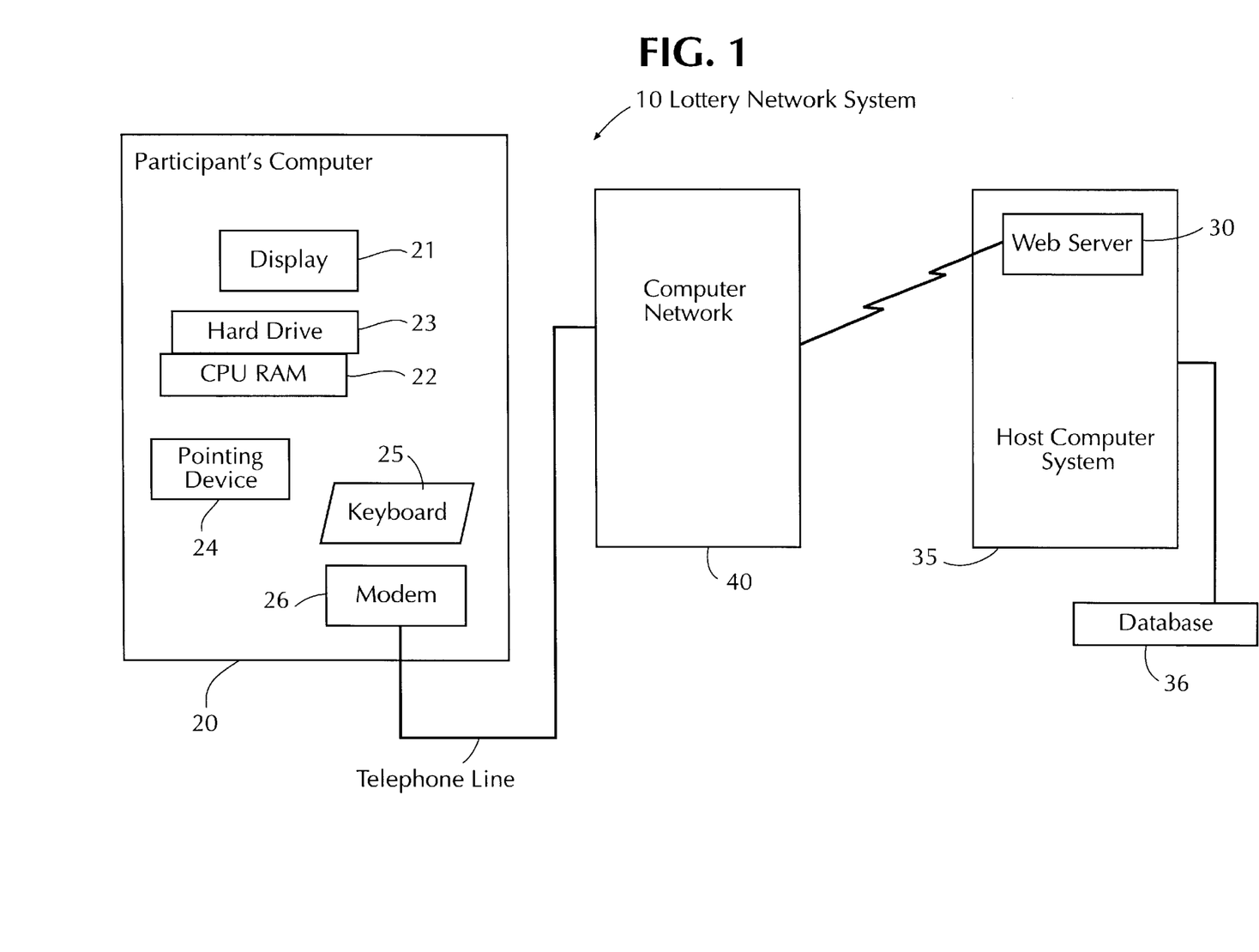
FIG. 1 is a diagram of the computer network environment in accordance with the present invention.

Now referring to the drawings, a representative environment or system 10 in which the present invention may be implemented is shown in FIG. 1. The representative environment includes at least one personal computer system 20 of a lottery participant, connectable to the Web server of lottery authority 30 over computer network 40, such as, for example, the Internet. Through this network connection, computer system 20 can exchange data with Web server 30 that is running on host computer system 35 of the lottery authority. In the preferred embodiment of the current invention, Web server 30 is provided by Apache (www.apache.org) using the mod_perl and Apache::ASP add-ons for script processing, Scripts, images and Web documents are stored on the Web servers as files. Before being sent to the user, scripts are processed by the Web server. Data is transmitted to the user using standard Web protocols (HTTP on port 80). Input from the user is handled through standard forms, hyperlinks, and Javascript functions. The Apache Web server may be running on host computer system 35 either as a service on Windows NT, or as a console application on Windows 95 computer system. Additionally, the Apache Web server (or another type of Web server) may operate on Unix-based machines as a daemon process which executes continuously and handles incoming communications with computer systems of lottery participants through the Internet. Alternatively, Web server of the lottery authority may operate on a network of computers, connected either as a local area network (LAN), a wide area network (WAN), or possibly as multiple independent computer system connectable to each other through the Internet.

Computer system 20 of the lottery participant is a computer system that is connectable to the Internet through an Internet Service Provider (ISP), an online service provider (e.g., Compuserve®, America Online®, etc.) or other available connection means. As further shown in FIG. 1, computer system 20 of a lottery participant is preferably a personal computer such as, a desktop, notebook or palmtop device running one of many well known operating systems and equipped with Internet browsing capabilities. The computer system 20 preferably includes a central processing unit, display 21 having a graphical user interface (GUI), random access memory (RAM) 22, permanent memory ("hard drive") 23, pointing device 24 (e.g., mouse or trackball) and a keyboard 25. Computer system 20 may also include modem 26 which may be used to connect through computer network 40 (the Internet in the preferred embodiment) to Web server 30 over standard phone lines. Alternatively, computer system 20 may be connected to Web server 30 by a cable connection through a local area network (LAN), a T1 line, a Digital Subscriber Line (DSL), wireless satellite link, or by other known devices and means for transferring data between computers over the Internet or other types of computer networks.

Computer system 20 also preferably includes Internet tools which provide electronic mail (E-mail), file transfer and browsing capabilities. It is preferable that the browser be of a type which is Java® and HTML enabled (e.g. Netscape Navigator® or Microsoft's Internet Explorer®). As is well known, Internet browsing and exchange of data between computer system 20 and Web server 30 may be effected using the Hypertext Transfer Protocol (HTTP) or such other protocols which provide access to multimedia files using Java®, Hypertext Markup Language (HTML), the extensible markup language (XML), the Standard Generalized Markup Language (SGML) or any other markup and scripting languages.

Referring back to FIG. 1, Web server 30 supports a collection of data related to the operation of a free lottery over the Internet, which are organized into data units known as Web pages, together comprising a Web site of the lottery authority. The Web server is accessible through the Internet or through another type of computer network in a known manner. In the Internet paradigm, a network path to the Web server is identified and accessed by the so-called Uniform Resource Locator (URL) that has a special syntax for defining a network connection. Using an HTML or Java® compatible browser (e.g. Netscape Navigator® or Microsoft's Internet Explorer®) on the computer system 20, the lottery participant specifies and enters the URL identifying link to the Web server 30. In response, the computer system of the lottery participant makes a connection request to the Web server identified in the URL link and receives in return a document formatted according to HTML, Java® Script or other type of a markup language that represents the image of the so-called home page of the Web server of the lottery authority. An example of such home page is shown on FIG. 2A. Once the initial connection and transfer of a home page has been established, the Web browser of the lottery participant's computer system 20 permits the user to navigate though the screens, or so-called Web pages, which comprise the Internet Web site of the lottery authority. The Web pages are preferably formatted in HTML or Java® Script (or other types of markup language) and incorporate Java applets for facilitating navigation among the Web pages (or screens) of the Web site and for facilitating entry of information into the fields of those Web pages. As with most HTML and similarly formatted. Web sites, the so-called "hyperlinks" or "hypertext links" are preferably embedded in the Web pages which permit a user to move from one Web page within a particular site to another or to move to another Web server, i.e. through a URL specifying different computer location on the network.

Figure 2A:
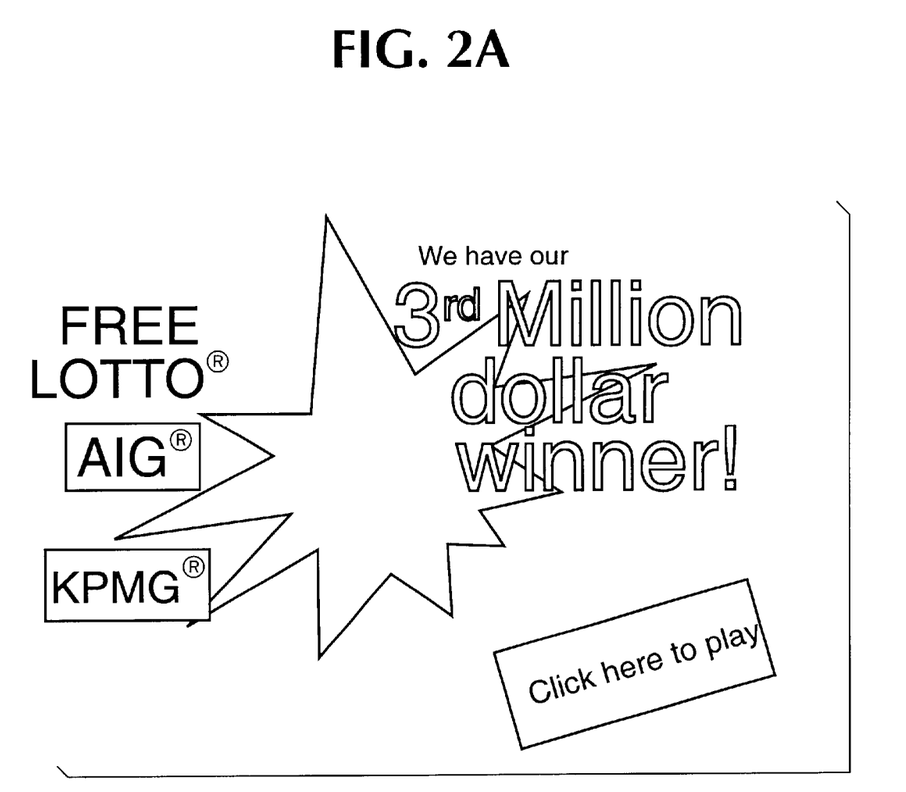
FIGS. 2A, 2B and 2C show exemplary screens representing typical home page of the Web server, the log-in Web page and a registration Web page on the Web server of the lottery authority.
Figure 2B:
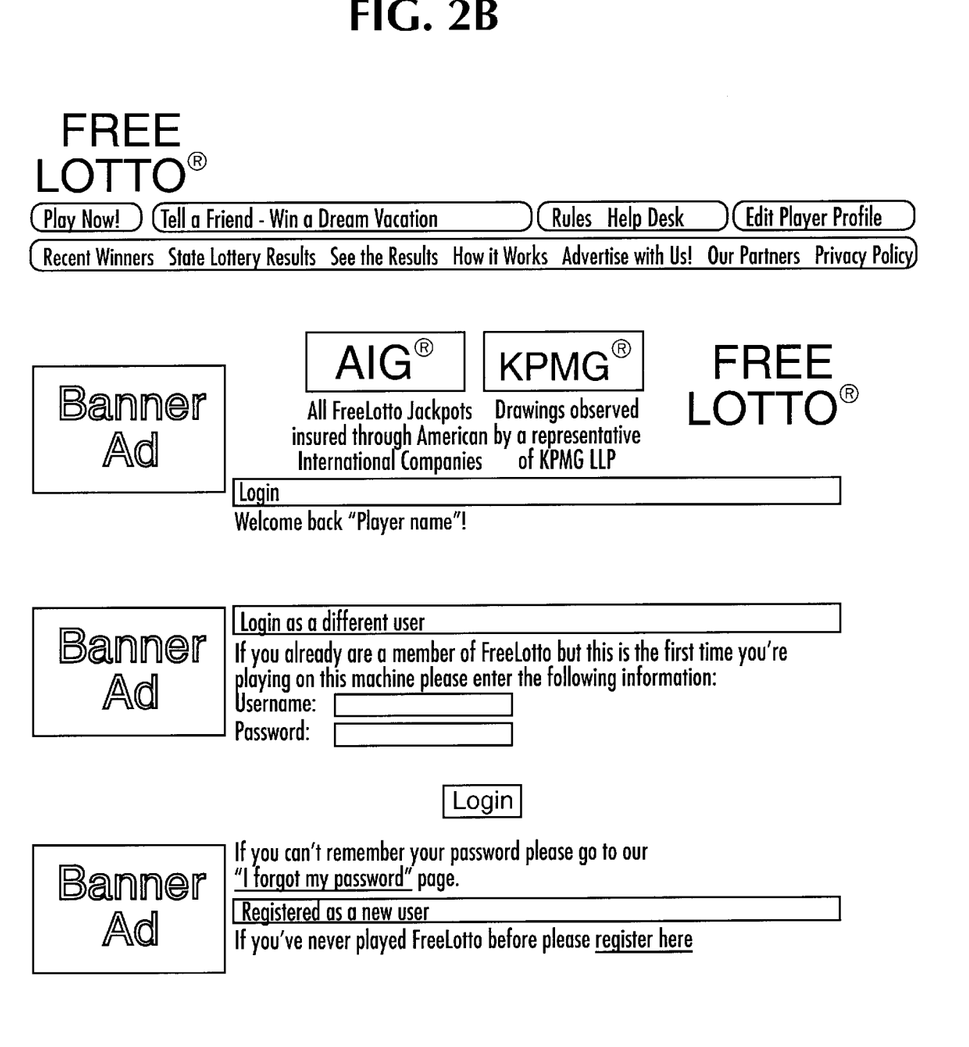

Referring to FIGS. 1 and 2A, when a connection has been established between the computer system of lottery participant 20 and Web server 30 of the lottery authority, the document formatted according to HTML, Java® Script or other type of a markup language that represents the image of the so-called home page of the Web server of the lottery authority is transmitted to computer system 20. The home page of the Web server 30 preferably contains a hypertext or hyperlink to the log-in Web page, example of which is shown in FIG. 2B. The lottery participant may preferable use the pointing device 24 (e.g., mouse or trackball) of computer system 20 to "click" on the hyperlink on the home page of Web server 30 and effect the transfer of the log-in Web page from the Web server 30 to computer system 20. The use of hypertext or hyperlink connections to navigate from one Web page of a Web site to another is well known and understood in the art.

Registration of Lottery Participants

Figure 2C:
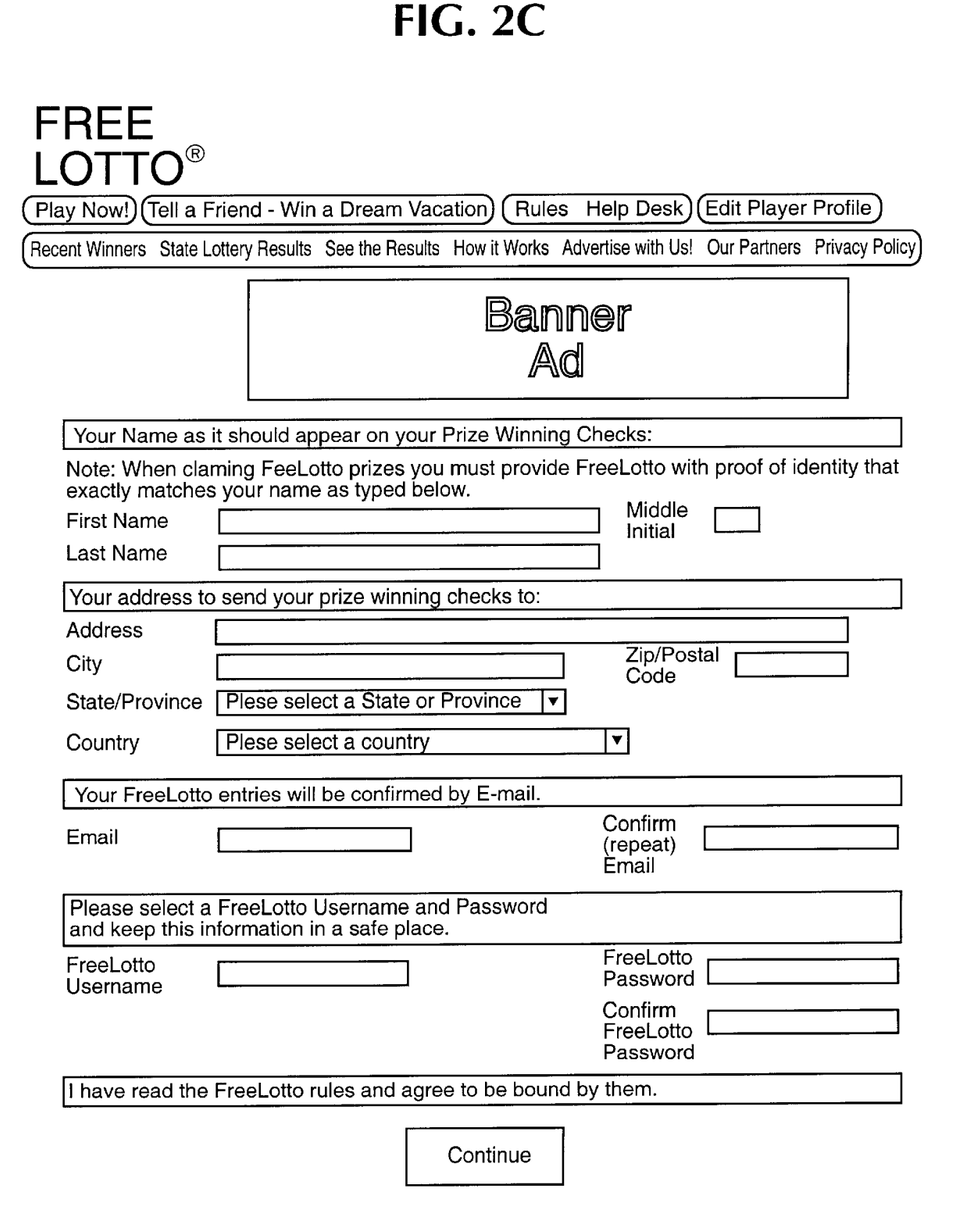

When a lottery participant connects to the Web server of the lottery authority for the first time, he or she must undergo a registration procedure. Initially, after making a selection of numbers, a new participant clicks on a "click to win" button or hypertext which switches him to a registration page, an example of such registration page according to the preferred embodiment is shown on FIG. 2C. As the next step in the registration process, a new lottery participant is asked to enter certain relevant personal information such as the participant's first and last names, address and E-mail address. Additionally, the participant is also asked to select a log-in identification and password for future visits. After the participant has inputted the requested information and submitted the data on the registration page to the lottery authority, a record containing information about that participant is created and stored on the host computer system of the lottery authority. Upon registering, the host computer system of the lottery authority may store personal information provided by the participant in the system database 36, in data files or in computer memory, for future access and reference.

Furthermore, in the preferred embodiment of the lottery system according to the current invention, the log-in identification and password entered by the new registrant are stored as a "cookie" in the permanent memory of a personal computer used by the participant, preferable on hard drive 23 of computer system 20. Preferably the participant's log-in identification and password are securely encrypted or protected by a cryptographic hash such as MD5 to protect the integrity of the information. After completion of the registration procedure, the selections are entered.

Figure 2D:
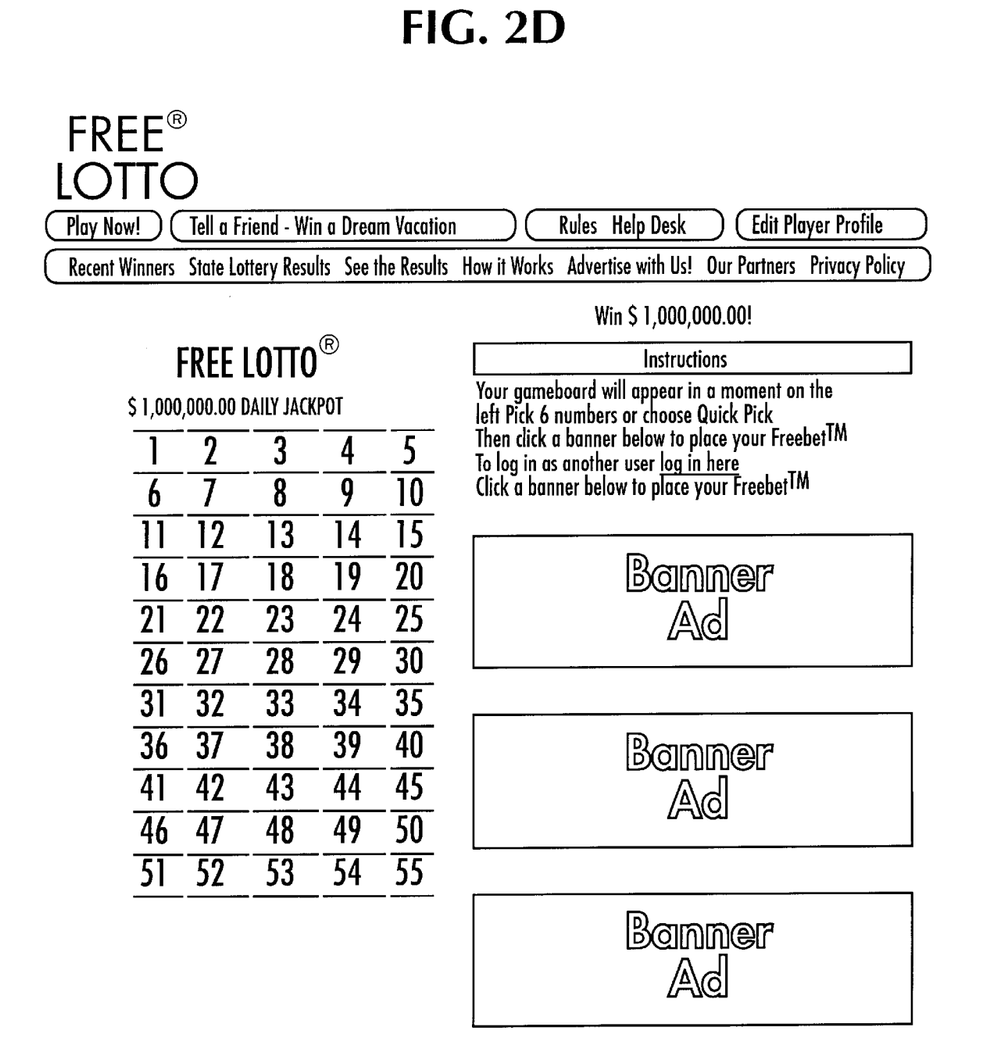
Figure 3:
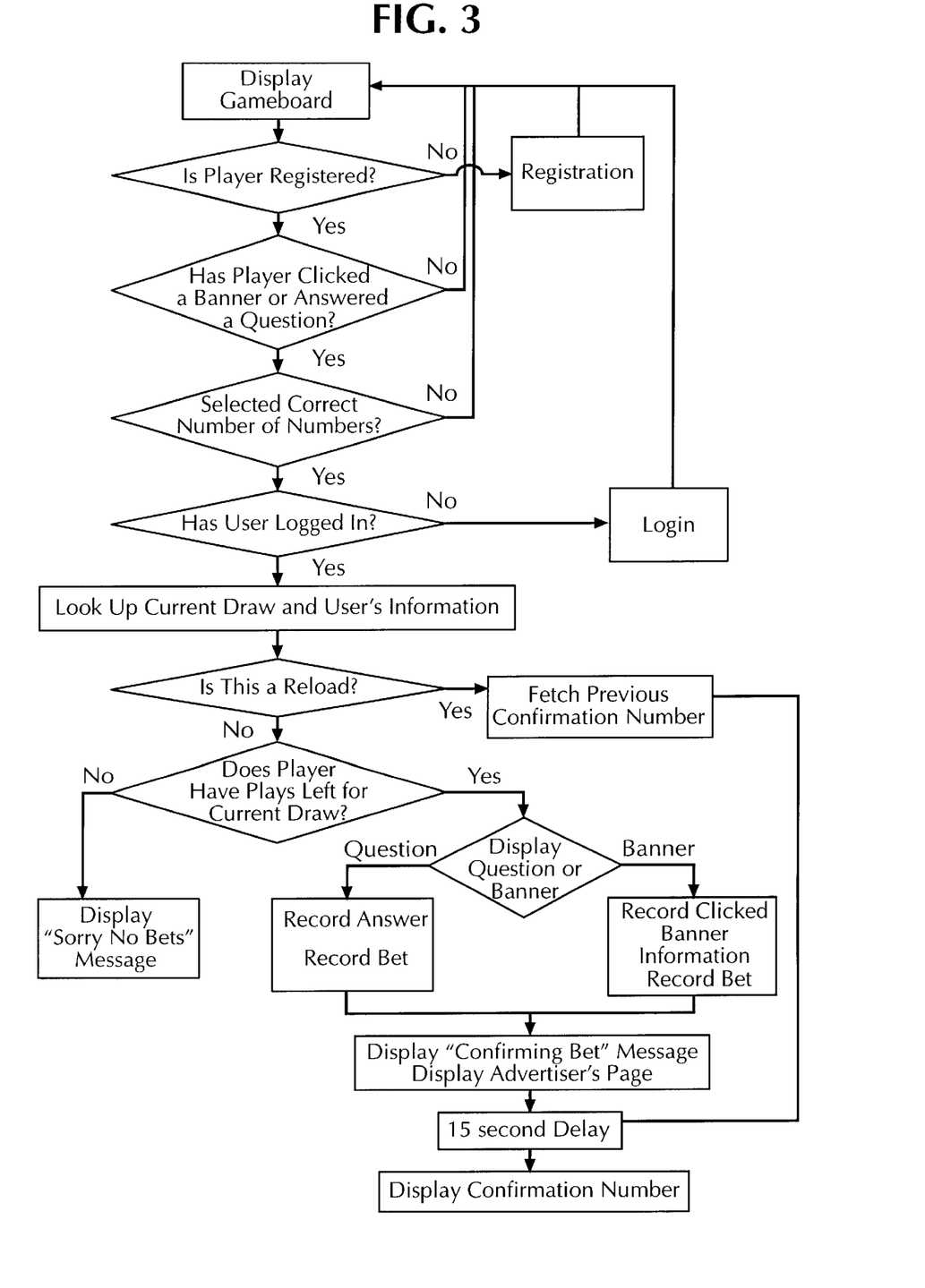
FIG. 3 is a flowchart describing the steps taken by the host computer system of the lottery authority in processing selections submitted by lottery participants.

When a lottery participant who already completed the registration procedure and selected a log-in id and password connects to the Web server of the lottery authority, host computer system 35 of the lottery authority extracts and decrypts the log-in id and password of the participant stored in the "cookie" of the computer memory of the participant's computer, follows general steps of the recognition algorithm shown on FIG. 3 to determine whether a particular participant is registered with the lottery authority or is a new participant. A registered lottery participant is recognized by the Web server of the lottery authority and may proceed to play the lottery by clicking on a hypertext "Play Lottery Now" and connecting to the "game" Web page of the lottery Web site. An example of a "game" page is shown in FIG. 2D. A participant who is not recognized by the host computer system of the lottery authority is asked to undergo the registration process, prior to his or her selection being accepted. As shown in the flowchart on FIG. 3, an already registered lottery participant who connects to the lottery Web site from a different computer may avoid duplicative registration by entering his log-in identification and password in the corresponding fields on the log-in Web page, shown in FIG. 2B.

Submission, Verification and Processing of Lottery Selections

Once a lottery participant is identified as being registered by the host computer system of the lottery authority, he may connect to the "game" Web page on the Web server. The "game" Web page preferably incorporates a Java® or HTML based "board". A lottery participant may then select a set of numbers from a larger set of unique numbers offered by the lottery authority. In the alternative embodiment, the set of numbers to choose from, as well as how many numbers a lottery participant is allowed to choose may be different. Additionally, letters, symbols or other types of unique indicia may be used instead of numbers. Furthermore, a lottery participant may be provided with an option of making a "quick pick", i.e. instead of "clicking" on each number individually, the participant clicks on a "quick pick" button, which selects 6 random numbers automatically. Specifically, the participant's selections are incorporated into an HTTP request. The Java applet causes the browser to make a normal "GET request" which includes the numbers chosen in the URL requested from the server whereas the HTML game board is a normal HTML form and uses a Pot request which transmits the information after the normal request information.

In order for a lottery participant to submit his or her selection of numbers to the Web server of the lottery authority, the participant must choose to receive information about one of several products advertised on the "game" Web page by "clicking" on one of several hyperlinks to the Web pages or Web servers of Internet vendors that contain information about various products and services. By "clicking" on one of these hyperlinks, a lottery participant is connected through URL to vendor's Web page or server, where the participant is kept for a short period of time, while the submission to the lottery authority is processed and verified.

Confirmation of Processed Selections

As shown in FIG. 3, to confirm the processed selections, the system determines if the user is an authentic requested user. If not, the user is returned to the log-in screen. The numbers chosen by the participant are extracted from the HTTP request, and the banner that was clicked by the participant (or the question that was answered) is likewise extracted. The system verifies that the user has clicked the banner (or answered a question) and has chosen exactly six distinct numbers. If not, the user is directed back to the play page, and the selected numbers are passed back to that page so that they remain chosen and the user is given the opportunity to choose the remainder of the six distinct numbers. The user's login identification is verified, or the numbers chosen are passed to the login page so that they will remain chosen after the user is either logged in or registered. The system obtains the current drawn number and date as well as user information including the user's last name, first name, email address and the like. The system then determines if the user has pressed reload (and if so, the confirmation for the existing entry is redisplayed). If the system verifies that the user is allowed to play again for the current draw, then the entry including the numbers chosen and the banner clicked (or answers chosen) are recorded, and the inventory remaining in the banner is updated.

The system then updates the "cookies" that list the questions answered and banner clicked for the purpose of choosing distinct questions or banners for the next game play. Thereafter, information about the banner clicked is obtained. That information along with information about the banner, numbers chosen, current draw, confirmation number, use of information, etc. is passed to the next page. The display then waits for the confirmation page which thereafter is confirmed with all of the information that has previously been passed.

Lottery Drawing

Figure 4:
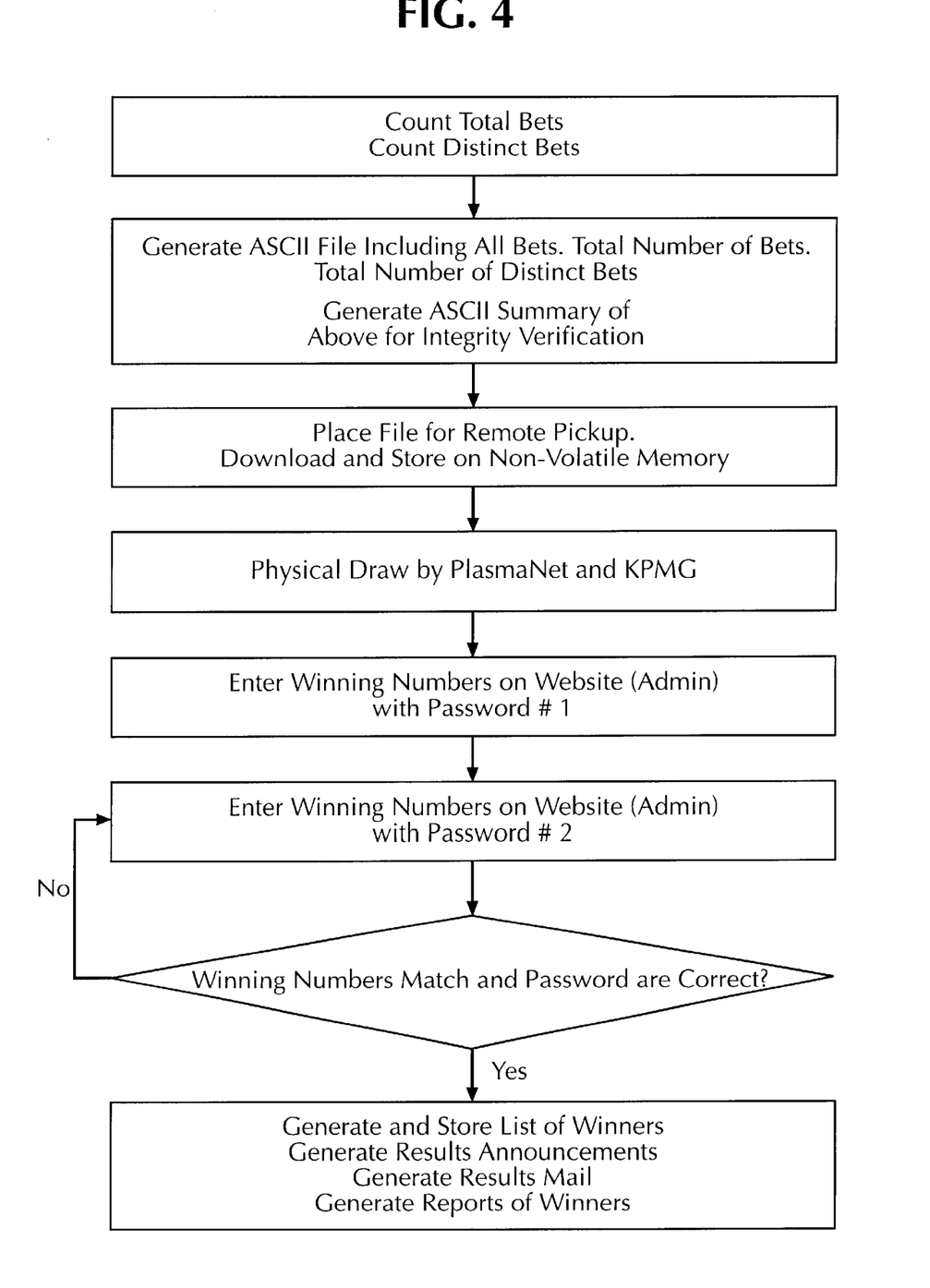
FIG. 4 is a flowchart describing the steps taken in conducting a lottery drawing.

As currently configured, at 3:00 p.m., the current draw is incremented to the following day, and a data file containing all bets is generated on the server and downloaded by the lottery authority. The lottery authority can then document the steps taken to perform the physical draw itself, and once the physical draw is completed, the lottery authority enters the numbers onto the computer system, as illustrated in FIG. 4.

The drawn numbers are entered onto a form on the website by the lottery authority and a password is entered by a first individual. The password is verified against a cryptographic hash and the numbers are entered a second time by a different individual, who in turn enters a second password. When this second password is verified, and the numbers are verified to be the same as those entered the first time, the winning numbers are added to the table of winning numbers. Thereafter, winners are extracted from the database and are added to a separate table of winning bets along with the number of correctly chosen numbers. An animation of the correct numbers is generated for the website.

Notification of Lottery Participants

Upon completion of the lottery drawing, the system obtains all of the bets made for that particular drawing, and for each one calculates the number of correctly chosen numbers. If the correctly chosen number is at least three, the system inserts identification of the participant into the list of winners, and the winners are notified at the email address they have submitted.

It will be appreciated that various additional modifications and improvements thereon will become readily apparent to those skilled in the art. Accordingly, the spirit of the scope of the present invention is to be construed broadly and limited only by the appended claims, and not the foregoing specification.

What is claimed is:

1. In a computer network comprised of a plurality of computers capable of exchanging digital information between at least two of said plurality of computers, at least one of said plurality of computers being associated with at least one lottery participant and at least one of said plurality of computers being associated with a central host system of a lottery authority, a free lottery gaming system comprising:
   a) means for connecting at least one of said plurality of computers being associated with at least one lottery participant to at least one of said plurality of computers being associated with said central host system of the lottery authority;
   b) means for exchanging digital information between at least one of said plurality of computers being associated with at least one lottery participant to at least one of said plurality of computers being associated with said central host system of the lottery authority;
   c) means for identifying each lottery participant connected to at least one of said plurality of computers being associated with said central host system of the lottery authority;
   d) means for enabling each identified lottery participant to select a set of indicia by choosing a plurality of characters;
   e) means for enabling said lottery participant identified by said central host system to receive information about one or more specific products or services advertized by said lottery authority by clicking on at least one hyperlink associated with at least one of said advertised products or services, said clicking on said hyperlink by said lottery participant being required of said lottery participant in order to participate in the lottery;
   f) means for submitting said set of indicia from said computer system of each said lottery participant to at least one of said plurality of computers being associated with said central host system of the lottery authority; and
   g) means for verifying said submission of each said lottery participant by said central host system of the lottery authority; and
   h) means for selecting an official winning set of indicia from a plurality of characters during an official lottery drawing, conducted or reported by said lottery authority;
   whereby the lottery participant who selects a set of indicia that either fully or partially matches said official winning set of indicia receives a prize, without wagering any money or purchasing tickets in order to participate in said official lottery drawing and qualify for a prize.

2. The lottery gaming system according to claim 1, wherein the prize given to each lottery participant who selects a set of indicia that matches said official winning set of indicia is a pre-determined sum of money or a portion of a pre-determined sum of money.

3. The lottery gaming system according to claim 1, wherein each said lottery participant selects a smaller subset of numbers from a larger set of numbers, said larger set of numbers being chosen by said gaming authority.

4. The lottery gaming system according to claim 1, further comprising the means for counting and limiting the number of lottery selections and submissions that each lottery participant may enter for each official lottery drawing.

5. The lottery gaming system according to claim 1, wherein the exchange of digital information between at least one of said plurality of computers being associated with at least one lottery participant to at least one of said plurality of computers being associated with said central host system of the lottery authority is established over a secure link between said host system of the lottery authority and said computer of said lottery participant.

6. The lottery gaming system recited in claim 1, wherein the digital information exchanged between at least one of said plurality of computers being associated with at least one lottery participant to at least one of said plurality of computers being associated with said central host system of the lottery authority is accomplished through the means of encryption of said exchange data.

7. The lottery gaming system according to claim 1, wherein each lottery participant is connected to at least one of plurality of computers being associated with at least one product or service advertized on said central host system of the lottery authority and receives information about at least one said product or service during a pre-determined fixed period of time, while said submission of said participant is verified by said lottery authority.

8. In a computer network comprised of a plurality of computers capable of exchanging digital information between at least two of said plurality of computers, at least one of said plurality of computers being associated with at least one lottery participant and at least one of said plurality of computers being associated with a central host system of a lottery authority, a method of conducting a free lottery comprising the steps of:
   a) connecting at least one of said plurality of computers being associated with at least one lottery participant to at least one of said plurality of computers being associated with said central host system of the lottery authority;
   b) identifying each said lottery participant to said central host system of the lottery authority;
   c) enabling each said lottery participant identified by said central host system of the lottery authority to select a set of indicia by choosing a plurality of characters;
   d) enabling each lottery participant having selected a set of indicia to receive information about one or more specific products or services advertised by said lottery authority by clicking on at least one hyperlink associated with at least one of said advertized products or services, said clicking on said hyperlink by said lottery participant being required of said lottery participant in order to participate in the lottery;
   e) submitting said set of indicia selected by each said lottery participant from said computer system of such participant to said central host system of the lottery authority; and
   f) verifying said submission of each said lottery participant by said central host system of the lottery authority; and g) selecting an official winning set of indicia from a plurality of characters during an official lottery drawing, conducted or reported by said lottery authority;

whereby the participant who selects a set of indicia that either fully or partially matches said official winning set of indicia receives a prize, without wagering any money or purchasing tickets in order to participate in said lottery drawing and qualify for the prize.

9. The method of conducting a lottery recited in claim 8, wherein the prize given to each lottery participant who selects a set of indicia that matches said official winning set of indicia is a predetermined sum of money or a portion of a pre-determined sum of money.

10. The method of conducting a lottery recited in claim 8, where in each said lottery participant selects a smaller subset of numbers from a larger set of numbers, said larger set of numbers being chosen by said gaming authority.

11. The method of conducting a lottery recited in claim 8, further comprising the step of counting and limiting the number of lottery selections and submissions that each said lottery participant may enter for each official lottery drawing.

12. The method of conducting a lottery recited in claim 8, wherein the step of exchanging digital information between at least one of said plurality of computers being associated with at least one lottery participant to at least one of said plurality of computers being associated with said central host system of said lottery authority is accomplished over a secure link between said host system of the lottery authority and said computer of said lottery participant.

13. The method of conducting a lottery recited in claim 8, wherein the digital information exchanged between at least one of said plurality of computers being associated with at least one lottery participant to at least one of said plurality of computers being associated with said central host system of the lottery authority is accomplished through the means of encryption of said exchange data.

14. The method of conducting a lottery recited in claim 8, wherein each lottery participant is connected to at least one of plurality of computers being associated with the product or services advertised on said central host system of the lottery authority and receives information about one or more of said products or services during a pre-determined fixed period of time, while said submission of said participant is verified by said lottery authority.

15. A free lottery gaming system comprising:

at least one computer associated with a central host system of a lottery authority capable of connecting through a computer network to at least one computer associated with at least one lottery participant, and further capable of exchanging digital information with said computer of each participant connected to said central host system;

at least one computer associated with at least one lottery participant, capable of connecting and exchanging digital information with said central host system of the lottery authority, wherein said central host system of the lottery authority processes digital information that is submitted or received from said computer of at least one lottery participant that is connected to said central host system, identifies said lottery participant on the basis of said digital information, enables said lottery participant connected to said central host system to select a set of indicia by choosing a plurality of characters and further enables said lottery participant to receive information about one or more specific products or services advertised on said central host system of the lottery authority by clicking on at least one hyperlink associated with said lottery participant, said clicking on said hyperlink by said lottery participant being required of said lottery participant in order to participate in the lottery, and verifies said selection upon its transmission from said computer of said lottery participant to said central host system of the lottery authority;

an official drawing, wherein the official winning set of indicia is selected from a plurality of characters during an official lottery drawing conducted or reported by said lottery authority;

a notification of winning, sent by said lottery authority to one or more lottery participants who respectively selected a set of indicia that either fully or partially matched said official winning set of indicia, entitling each said participant to receive a prize, without wagering any money or purchasing tickets in order to participate in said official lottery drawing and qualify for the prize.

16. The lottery gaming system according to claim 15, wherein the prize given to each lottery participant who selects a set of indicia that matches said official winning set of indicia is a pre-determined sum of money or a portion of a pre-determined sum of money.

17. The lottery gaming system according to claim 15, wherein each said lottery participant selects a smaller subset of numbers from a larger set of numbers, said larger set of numbers being chosen by the gaming authority.

18. The lottery gaming system according to claim 15, wherein the computer associated with said central host system of a lottery authority counts and limits the number of lottery selections and submissions that each said lottery participant may enter for each official lottery drawing.

19. The lottery gaming system according to claim 15, wherein the exchange of digital information between at least one computer associated with at least one lottery participant and at least one computer associated with said central host system is established over a secure link between said host system of the lottery authority and said computer of said lottery participant.

20. The lottery gaming system recited in claim 15, wherein the digital information exchanged between at least one computer associated with at least one lottery participant and at least one computer associated with said central host system of the lottery authority is accomplished through the means of encryption of said exchange data.

21. The lottery gaming system according to claim 15, wherein each lottery participant is connected to at least one computer associated with the product or services advertized on said central host system of the lottery authority and receives information about one or more of said products or services during a pre-determined fixed period of time, while said submission of said participant is verified by said lottery authority.

22. In a computer network comprised of a plurality of computers capable of exchanging digital information between at least two of said plurality of computers, at least one of said plurality of computers being associated with at least one lottery participant and at least one of said plurality of computers being associated with a central host system of a lottery authority, a free lottery gaming system comprising:

a) means for connecting at least one of said plurality of computers being associated with at least one lottery participant to at least one of said plurality of computers being associated with said central host system of the lottery authority;

b) means for exchanging digital information between at least one of said plurality of computers being associated with at least one lottery participant to at least one of said plurality of computers being associated with said central host system of the lottery authority;

c) means for identifying each lottery participant connected to at least one of said plurality of computers being associated with said central host system of the lottery authority;

d) means for enabling each identified lottery participant to select a set of indicia by choosing a plurality of characters;

e) means for enabling said lottery participant identified by said central host system to interact with one or more specific advertisers of products or services advertised by said lottery authority by clicking on at least one hyperlink associated with at least one of said advertised products or services, said clicking on said hyperlink by said lottery participant being required of said lottery participant in order to participate in the lottery;

f) means for submitting said set of indicia from said computer system of each said lottery participant to at least one of said plurality of computers being associated with said central host system of the lottery authority; and g) means for verifying said submission of each said lottery participant by said central host system of the lottery authority; and h) means for selecting an official winning set of indicia from a plurality of characters during an official lottery drawing, conducted or reported by said lottery authority;

whereby the lottery participant who selects a set of indicia that either fully or partially matches said official winning set of indicia receives a prize, without wagering any money or purchasing tickets in order to participate in said official lottery drawing and qualify for a prize.

\* \* \* \* \*

(12) EX PARTE REEXAMINATION CERTIFICATE (6359th)
United States Patent
Aronin (10) Number: US 6,454,650 C1
(45) Certificate Issued: Aug. 12, 2008

(54) FREE REMOTE LOTTERY SYSTEM

(75) Inventor: Kevin J. Aronin, New Rochelle, NY (US)

(73) Assignee: Plasmanet, Inc., New Rochelle, NY (US)

Reexamination Request:
No. 90/008,147, Sep. 21, 2006

Reexamination Certificate for:
Patent No.: 6,454,650
Issued: Sep. 24, 2002
Appl. No.: 09/568,199
Filed: May 9, 2000

(51) Int. Cl.
*A63F 9/24* (2006.01)

(52) U.S. Cl. .............................. 463/17; 463/29; 463/42; 705/14

(58) Field of Classification Search .................... 463/17, 463/29, 42; 705/14
See application file for complete search history.

(56) References Cited

PUBLICATIONS

Webpage: Yahoo!® Help—Treasure Hunt; http://help.yahoo.com/help/us/promo/hunt/hunt–12.html; Publication Date: Unknown.
Webpage: Yahoo!® Privacy; http://privacy.yahoo.com; Publication Date: Unknown.
Webpage: Northern Virginia Fortune Seekers: Yahoo!® Treasure Hunt Shortcuts—(10); http://members.tripod.com/~jupiterx/getrichclick.html; Publication Date: Unknown.
Webpage: PRIZES.COM—Where you can win Up to $100,000.00 Instantly; http://web.archive.org/web/19970209033416/http://www.prizes.com/; Publication Date: Unknown.
Webpage: RealTIME Player Registration; http://web.archive.org/web/19970209033622/www.prizes.com/createacct.html; Publication Date: Unknown.
Webpage: $$$ Prizes Domain's Token Explosion $$$; http://web.archive.org/web/19970209033457/www.prizes.com/iwg/; Publication Date: Unknown.
Webpage: Token Explosion—How the Game Works; http://web.archive.org/web/19970209033840/www.prizes.com/iwg/tokenexp–how.html; Publication Date: Unknown.
Webpage: Token Explosion—Official Rules; http://web.archive.org/web/19970209033912/www.prizes.com/iwg/tokenexp–rules.html; Publication Date: Unknown.
Webpage: Prizes Domain's—Click & Win!; http://web.archive.org/web/19970209033540/www.prizes.com/cw/; Publication Date: Unknown.
Webpage: Click & Win—How the Game Works; http://web.archive.org/web/19970209034031/www.prizes.com/cw/cw–how.html; Publication Date: Unknown.
Webpage: Click & Win's Official Rules; http://web.archive.org/web/19970209034018/www.prizes.com/cw/cw–html; Publication Date: Unknown.
Webpage: $$$$$ Prizes Domains's—Incognito $$$$$; http://web.archive.org/web/19970209033513/www.prizes.com/incog/; Publication Date: Unknown.
Webpage: $$$$$ Prizes Domains's—Incognito $$$$$; http://web.archive.org/web/19970209033953/www.prizes.com/incog/how–works.html; Publication Date: Unknown.
Webpage: Incognito—Official Rules; http://web.archive.org/web/19970209033943/www.prizes.com/incog/official–rules.html; Publication Date: Unknown.

(Continued)

*Primary Examiner*—Jimmy G. Foster (57) ABSTRACT

The free remote lottery system is played by a participant who selects a set of indicia that either fully or partially matches an official winning set of indicia and receives a prize, without wagering any money or purchasing tickets in order to participate in the lottery and qualify for a prize. The participant must select information about one or more products or services in order to participate in the lottery.

OTHER PUBLICATIONS

Webpage: Wintertime@WebStakes™ Sweepstakes; http://web.archive.org/web/19970130023624/http://web-stakes.com; Publication Date: Unknown.

Webpage: Wintertime@WebStakes™ Sweepstakes; http://web.archive.org/web/19991001081304/www.web-stakes.com/kidstakes/winter/; Publication Date: Unknown.

Webpages describing Yahoo!® Treasure Hunt, including: http://privacy.yahoo.com; http://help.yahoo.com/help/us/promo/hunt/hunt–12.html; and http://members.tripod.com/~jupiterx/getrichclick.html; Publication Date: Unknown.

Webpages from PRIZES.COM including: http://web.archive.org/web/19970209033416/http://www.prizes.com/; http://web.archive.org/web/19970209033622/www.prizes.com/creatacct.html; http://web.archive.org/web/19970209033840/www.prizes.com/iwg/tokenexp–how.html; http://web.archive.org/web/19970209033457/www.prizes.com/iwg/; http://web.archive.org/web/19970209033912/www.prizes.com/iwg/tokenexp–rules.html; http://web.archive.org/web/19970209033540/www.prizes.com/cw/; and http://web.archive.org/web/19970209033513/www.prizes.com/incog/; Publication Date: Unknown.

Webpages from Wintertime@WebStakes™ Sweeptakes including http://web.archive.org/web/19970130023624/http://webstakes.com; and http://web.archive.org/web/19991001081304/www.webstakes.com/kidstakes/winter/; Publication Date: Unknown.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–22 is confirmed.

* * * * *